G. THEVENIN.
MEANS FOR LUBRICATING CINEMATOGRAPHIC PROJECTION APPARATUS.
APPLICATION FILED JULY 28, 1919.

1,363,290.

Patented Dec. 28, 1920.

Inventor
Georges Thevenin
By Chas. J. O'Neill
Atty

UNITED STATES PATENT OFFICE.

GEORGES THEVENIN, OF ST. GERMAIN EN LAYE, FRANCE, ASSIGNOR TO ETABLISSEMENTS CONTINSOUZA, SOCIETE ANONYME, OF PARIS, FRANCE, A CORPORATION OF FRANCE.

MEANS FOR LUBRICATING CINEMATOGRAPHIC PROJECTION APPARATUS.

1,363,290.     Specification of Letters Patent.     Patented Dec. 28, 1920.

Application filed July 28, 1919. Serial No. 313,831.

*To all whom it may concern:*

Be it known that I, GEORGES THEVENIN, a citizen of the French Republic, at Saint Germain en Laye, Department of Seine and Oise, in France, (and whose post-office address is 27 Rue Alexandre Dumas, in the said city,) have invented certain new and useful Improvements in Means for Lubricating Cinematographic Projection Apparatus; and I do hereby declare the following to be a full, clear, and exact description of the invention, such as will enable others skilled in the art to which it appertains to make and use the same.

This invention relates to a device for lubricating cinematographic projection apparatus by the automatic and continuous circulation of a lubricant. Lubrication of this type presents particular advantages for such apparatus, which is usually worked for several hours continuously. Hand lubrication under these conditions involves a good deal of labor, and if it is neglected the satisfactory working of the apparatus is impossible. Even if it is effected by a conscientious operator, the films of oil which is sometimes to be found in contact with highly heated parts, and which is not constantly renewed, no longer insures sufficient lubrication, whence there results excessive wear of certain parts of the apparatus. Moreover automatic lubrication of cinematographic apparatus presents the great advantage of preserving the film from all dirt caused either by drops of oil let fall by an unskilful operator or by the operator's fingers leaving traces of grease on the film.

In the device forming the subject matter of the present invention the lubrication is automatic, the lubricant flowing regularly and continuously from one part to another.

In the accompanying drawing, one constructional form of a cascade lubricating device is illustrated by way of example.

Figure 1:
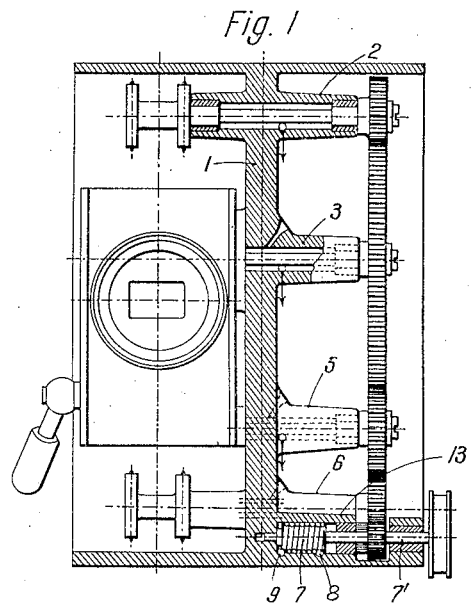
Figure 2:
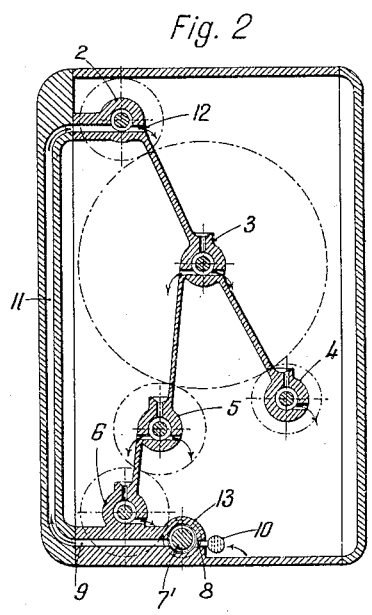

Figures 1 and 2 show diagrammatically a section of the apparatus and a front view respectively, in which the cascade circulation of the lubricant is clearly indicated.

As shown in Fig. 1 the apparatus is divided into two compartments by a fluidtight partition 1 traversed by the various shafts of the apparatus. On one side of this partition is located the train of gear wheels the shafts of which have to be lubricated. The lower part of the compartment containing the gear wheels forms an oil tank, the oil being transferred to the upper part of the apparatus, to the point where the highest shaft to be lubricated is found, by means of an Archimedean screw 7 keyed on to a driving shaft 7' and housed in a boss 13 cast on the framework of the apparatus. Two apertures 8, 9 are formed in the said boss. The first aperture 8 is the suction aperture and is provided with a strainer 10, while the other orifice 9 is connected with a delivery passage 11 cast in the wall of the apparatus.

This passage 11 opens into the upper bearing 2 and the lubricating oil then passes from this bearing 2 through an aperture 12 and down the fluid-tight wall into an oil cup provided on the bearing 3. From the bearing 3 the oil continues its path, still by gravity, toward bearings 4, 5. From the bearing 4 it passes into the tank at the bottom and from the bearing 5 it passes finally to the bearing 6 and from there into the tank.

The lubrication is thus carried out in a continuous manner, the flow being maintained by the Archimedean screw, which might however be replaced by any other means that would effect the driving of the oil. The Archimedean screw however presents the advantage of not emulsifying the lubricant. The formation of coom in this device is also eliminated, owing to the energetic circulation of the oil and to the absence of dust, in consequence of the arrangement of the lubricating system in a fluidtight compartment. The absence of tubes of small bore in this device has the effect of completely eliminating the risks of obstruction in the piping.

It will of course be understood that this lubricating device may be applied to all cinematographic lanterns or cameras. The essential characteristic of the invention resides in the addition, to cinematographic apparatus, of a system of automatic lubrication with or without pressure. The lubricating apparatus may be driven by the driving shaft of the cinematographic apparatus, or it may be driven independently thereof.

Claims:

1. In a lubricating device for cinematographic apparatus, in combination with a casing, of a fluid tight partition dividing said casing into two compartments, one adapted to contain the film and its operating mechanism and the other the driving train of gears for said mechanism, said partition provided with bearings for the journals of said gears, and means for automatically lubricating said bearings and journals.

2. In a lubricating device for cinematographic apparatus, in combination with a casing, of a fluid tight partition dividing said casing into two compartments, one adapted to contain the film and its operating mechanism, and the other the driving train of gears for said mechanism, said partition provided with bearings for the journals of said gears, inlet and outlet lubricating openings in said bearings and means for automatically feeding oil to the inlet opening of each bearing.

3. In a lubricating device for cinematographic apparatus, in combination with a casing, of a fluid tight partition dividing said casing into two compartments, one adapted to contain the film and its operating mechanism, and the other the driving train of gears for said mechanism, said partition provided with bearings for the journals of said gears, inlet and outlet lubricating openings in each bearing, said bearings being so arranged that the oil will flow by gravity from one bearing to the other and means for automatically feeding oil to the upper bearing.

4. In a lubricating device for cinematographic apparatus, in combination with a casing, of a fluid tight partition dividing said casing into two compartments, one adapted to contain the film and its operating mechanism, and the other the driving train of gears for said mechanism, said partition provided with bearngs for the journals of said gears, inlet and outlet lubricating openings in each bearing, said bearings being so arranged that the oil will flow by gravity from one bearing to the other and finally to the bottom of the casing, forming an oil well, and means for automatically elevating the oil from said well to the upper bearing.

In testimony whereof I affix my signature, in presence of two witnesses.

GEORGES THEVENIN.

Witnesses:
 CHAS. P. PRESSLY,
 LOUIS YOSSER.